United States Patent
Chou et al.

(10) Patent No.: US 10,675,590 B2
(45) Date of Patent: Jun. 9, 2020

(54) POLYIMIDE COMPOSITION AND PREPARATION METHOD OF SEPARATION MEMBRANE

(71) Applicant: Taiwan Textile Research Institute, New Taipei (TW)

(72) Inventors: Shang-Chih Chou, New Taipei (TW); Chun-Hung Chen, New Taipei (TW); Chun-Hung Lin, New Taipei (TW); Kueir-Rarn Lee, New Taipei (TW)

(73) Assignee: Taiwan Textile Research Institute, New Taipei (TW)

( * ) Notice: Subject to any disclaimer, the term of this patent is extended or adjusted under 35 U.S.C. 154(b) by 80 days.

(21) Appl. No.: 15/472,309

(22) Filed: Mar. 29, 2017

(65) Prior Publication Data
US 2017/0291146 A1 Oct. 12, 2017

(30) Foreign Application Priority Data
Apr. 8, 2016 (TW) .............................. 105111005 A

(51) Int. Cl.
| | | |
|---|---|---|
| *B01D 67/00* | (2006.01) | |
| *B01D 69/12* | (2006.01) | |
| *C08G 73/10* | (2006.01) | |
| *B01D 69/02* | (2006.01) | |
| *B01D 71/60* | (2006.01) | |
| *B01D 71/64* | (2006.01) | |
| *C08L 79/08* | (2006.01) | |
| *C09D 179/08* | (2006.01) | |
| *B01D 61/36* | (2006.01) | |

(52) U.S. Cl.
CPC ...... *B01D 67/0009* (2013.01); *B01D 67/0011* (2013.01); *B01D 67/0016* (2013.01); *B01D 67/0088* (2013.01); *B01D 69/02* (2013.01); *B01D 69/125* (2013.01); *B01D 71/60* (2013.01); *B01D 71/64* (2013.01); *C08G 73/1042* (2013.01); *C08G 73/1071* (2013.01); *C08L 79/08* (2013.01); *C09D 179/08* (2013.01); *B01D 61/362* (2013.01); *B01D 2323/08* (2013.01); *B01D 2323/30* (2013.01); *B01D 2325/04* (2013.01)

(58) Field of Classification Search
CPC ..................................................... B01D 71/64
See application file for complete search history.

(56) References Cited

U.S. PATENT DOCUMENTS

| | | | | |
|---|---|---|---|---|
| 2005/0113527 A1* | 5/2005 | Perrella | .................... | C08K 5/17 525/310 |
| 2013/0047844 A1* | 2/2013 | Zheng | .................. | B01D 67/003 95/45 |
| 2015/0306539 A1* | 10/2015 | Yamato | ................ | B01D 53/228 429/145 |

FOREIGN PATENT DOCUMENTS

TW 201609865 3/2016

OTHER PUBLICATIONS

Yampolskii et al. Membrane Gas Separation, Jun. 2010, John Wiley & Sons.*
"Office Action of Taiwan Counterpart Application," dated Oct. 23, 2017, p. 1-p. 4, in which the listed reference as cited.

* cited by examiner

Primary Examiner — Alex A Rolland
(74) Attorney, Agent, or Firm — JCIPRNET

(57) ABSTRACT

A preparation method of separation membrane is provided. First, a polyimide composition including a dissolvable polyimide, a crosslinking agent and a solvent is provided. The dissolvable polyimide is represented by formula 1:

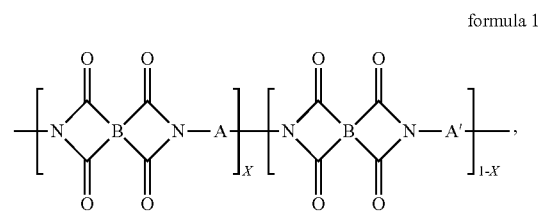

formula 1 wherein B is a tetravalent organic group derived from a tetracarboxylic dianhydride containing aromatic group, A is a divalent organic group derived from a diamine containing aromatic group, A' is a divalent organic group derived from a diamine containing aromatic group and carboxylic acid group, and $0.1 \le X \le 0.9$. The crosslinking agent is an aziridine crosslinking agent, an isocyanate crosslinking agent, an epoxy crosslinking agent, a diamine crosslinking agent, or a triamine crosslinking agent. A crosslinking process is performed on the polyimide composition. The polyimide composition which has been subjected to the crosslinking process is coated on a substrate to form a polyimide membrane. A wet phase inversion process is performed on the polyimide membrane.

10 Claims, No Drawings

POLYIMIDE COMPOSITION AND PREPARATION METHOD OF SEPARATION MEMBRANE

CROSS-REFERENCE TO RELATED APPLICATION

This application claims the priority benefit of Taiwan application serial no. 105111005, filed on Apr. 8, 2016. The entirety of the above-mentioned patent application is hereby incorporated by reference herein and made a part of this specification.

BACKGROUND OF THE INVENTION

1. Field of the Invention

The present invention generally relates to a composition, and particularly to a polyimide composition, and a preparation method of separation membrane using the polyimide composition.

2. Description of Related Art

Membrane separation processes are a technology that becomes increasingly important in the field of separation science, and find wide use in the separation of gas or liquid components, for example gas separation, pervaporation (PV), or liquid filtration. In a conventional membrane separation process, the film is generally made of polytetrafluoroethylene (PTFE), ceramic or glass fiber. Although the PTFE, ceramic or glass fiber separation membranes all have good solvent resistance, the processability of the ceramic or glass fiber separation membranes is poor. Moreover, in the prior art, the PTFE, ceramic or glass fiber separation membrane can only be used in microfiltration (MF). Therefore, one objective in urgent need for development in the field is to prepare a separation membrane with good solvent resistance and processability that can be used in ultrafiltration (UF), nanofiltration (NF), etc.

SUMMARY OF THE INVENTION

Accordingly, the present invention is directed to a polyimide composition that is useful in a preparation method of separation membrane, and a separation membrane with good solvent resistance and processability that can be used in UF and NF can be prepared through the preparation method.

The preparation method of separation membrane according to the present invention comprises the following steps. First, a polyimide composition including a dissolvable polyimide, a crosslinking agent, and a solvent is provided. The dissolvable polyimide is represented by formula 1 below:

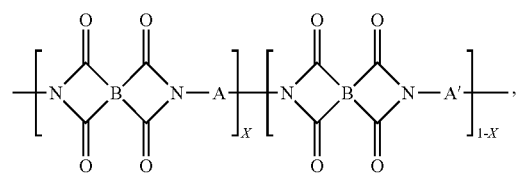

formula 1 where B is a tetravalent organic group derived from a tetracarboxylic dianhydride containing aromatic group, A is a divalent organic group derived from a diamine containing aromatic group, A' is a divalent organic group derived from a diamine containing aromatic group and carboxylic acid group, and $0.1 \leq X \leq 0.9$. The crosslinking agent is an aziridine crosslinking agent, an isocyanate crosslinking agent, an epoxy crosslinking agent, a diamine crosslinking agent, or a triamine crosslinking agent. A crosslinking process is performed on the polyimide composition. The polyimide composition which has been subjected to the crosslinking process is coated on a substrate to form a polyimide membrane. A wet phase inversion process is performed on the polyimide membrane.

In an embodiment of the present invention, the polyimide composition further includes an additive, including a surfactant, a porogen or a combination thereof.

In an embodiment of the present invention, the polyimide composition further includes sorbitan monolaurate, polyoxyethylene sorbitan monolaurate, ethylene glycol, polyvinyl pyrrolidone, acetone or a combination thereof.

In an embodiment of the present invention, based on the total weight of the polyimide composition, the content of the dissolvable polyimide is 5 to 25 wt %, the content of the crosslinking agent is 1 to 15 wt %, and the content of the additive is 1 to 30 wt %.

In an embodiment of the present invention, in formula 1, B is

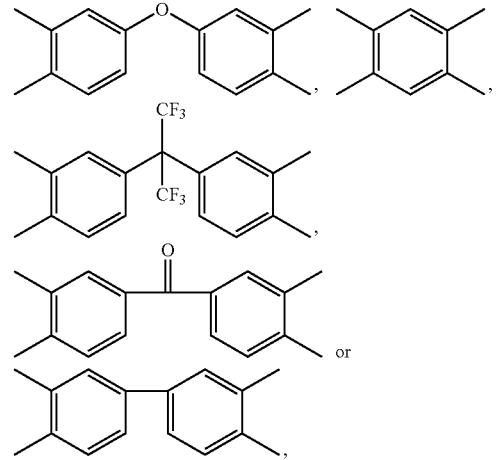

A is

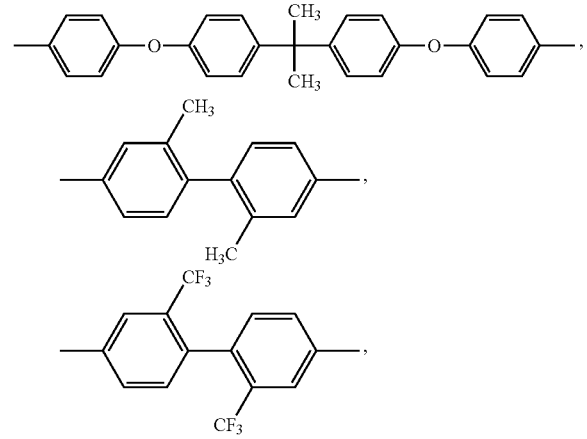

3
-continued
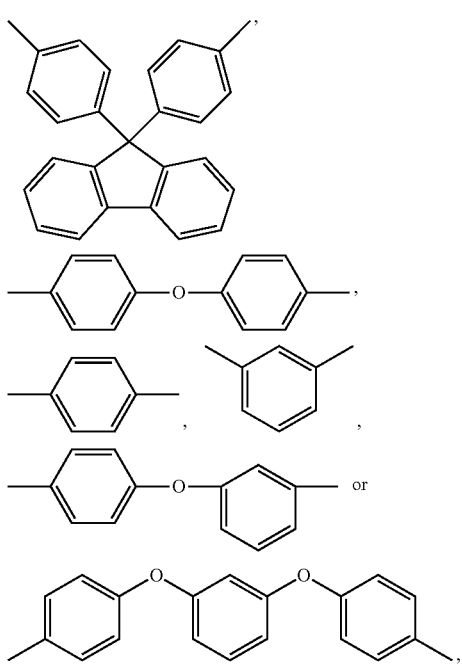
and A' is
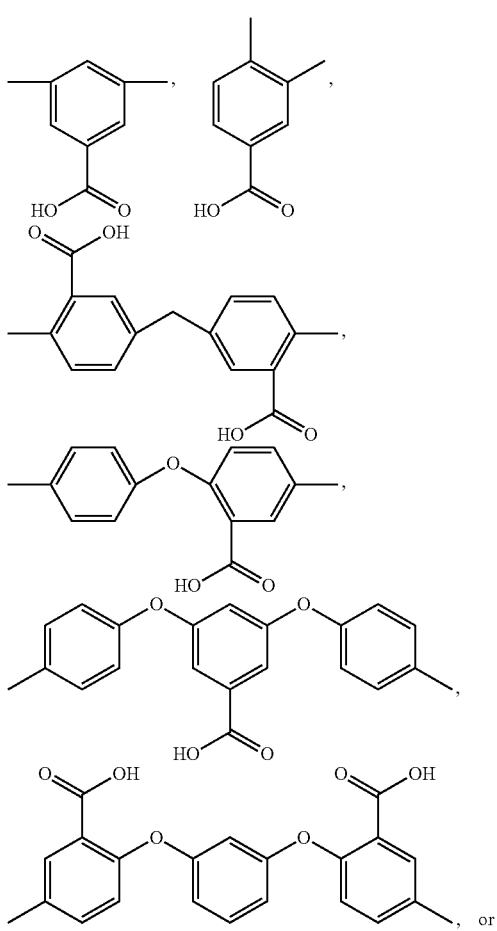
4
-continued
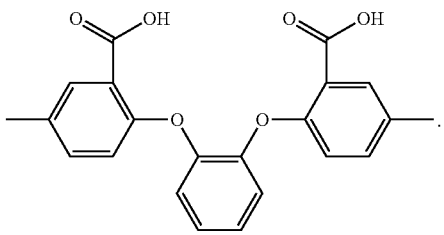
In an embodiment of the present invention, in formula 1, B is
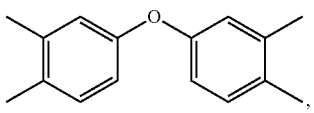
A is
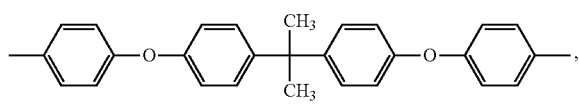
and A' is
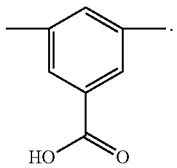
In an embodiment of the present invention, the aziridine crosslinking agent may include
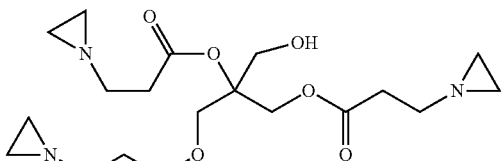
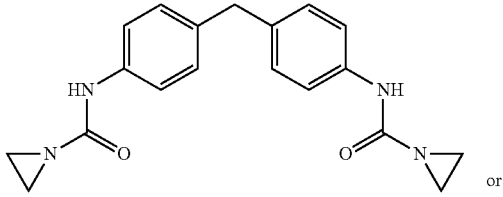
or -continued

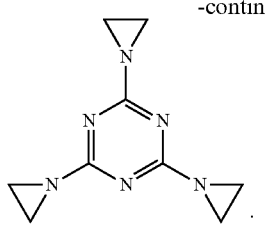

In an embodiment of the present invention, the duration of the crosslinking process is from 1 to 8 hours, and the temperature of the crosslinking process is in the range of 15 to 100° C.

In an embodiment of the present invention, the thickness of the polyimide membrane is in the range of 50 to 200 μm.

In an embodiment of the present invention, before the wet phase inversion process is performed on the polyimide membrane, the method further includes standing the polyimide membrane for 5 to 120 minutes.

The polyimide composition of the present invention includes a dissolvable polyimide, a crosslinking agent, and a solvent. The dissolvable polyimide is represented by formula 1:

formula 1

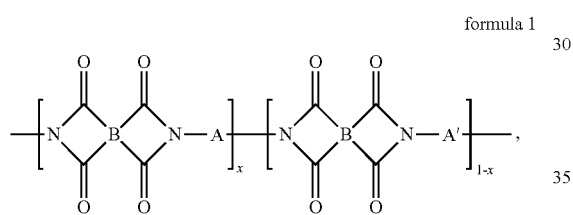

where B is a tetravalent organic group derived from a tetracarboxylic dianhydride containing aromatic group, A is a divalent organic group derived from a diamine containing aromatic group, A' is a divalent organic group derived from a diamine containing aromatic group and carboxylic acid group, and $0.1 \leq X \leq 0.9$. The crosslinking agent is an aziridine crosslinking agent, an isocyanate crosslinking agent, an epoxy crosslinking agent, a diamine crosslinking agent, or a triamine crosslinking agent.

In an embodiment of the present invention, in formula 1, B is

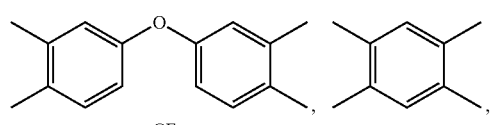

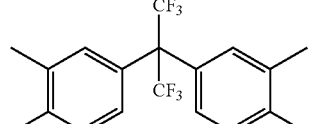

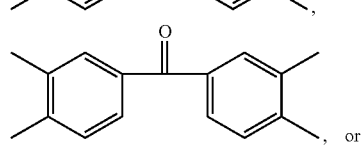, or

-continued

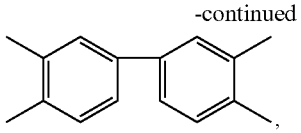,

A is

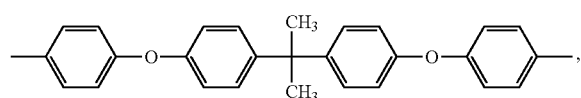

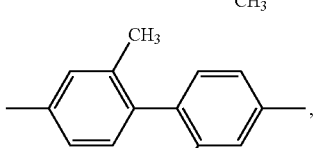,

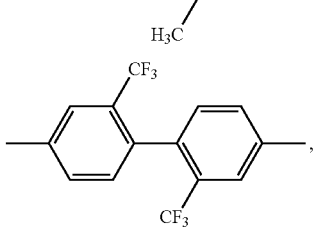,

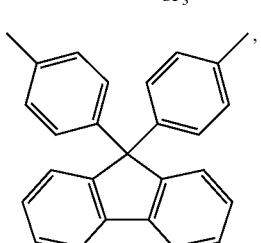,

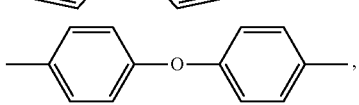,

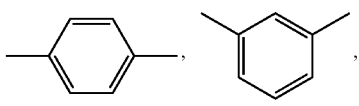,

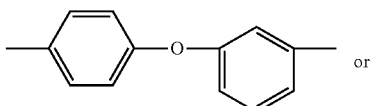 or

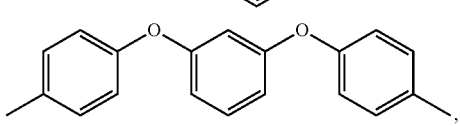, and A' is

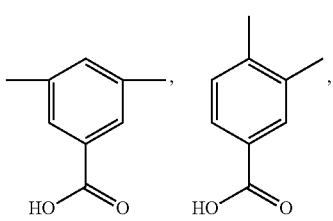, 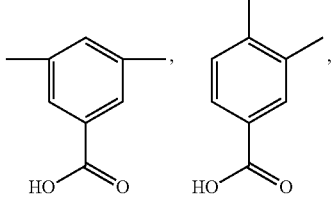,

-continued

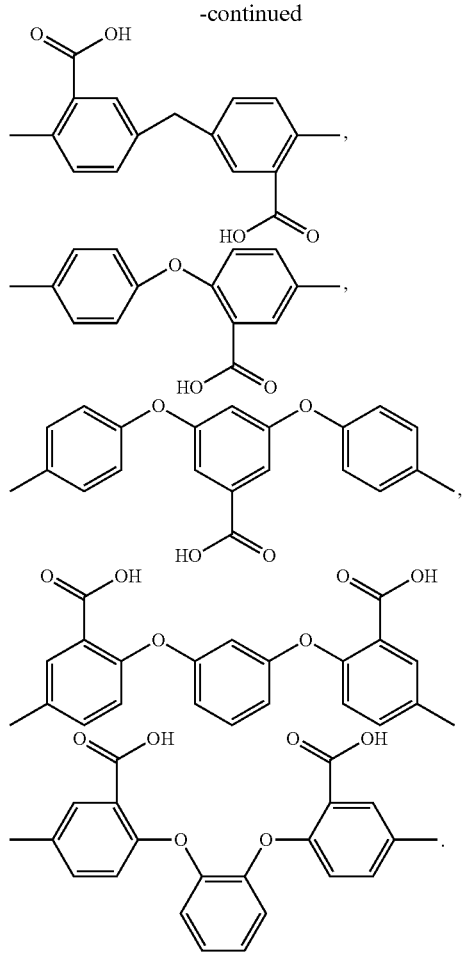

In an embodiment of the present invention, in formula 1, B is

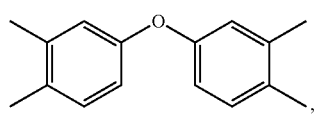

A is

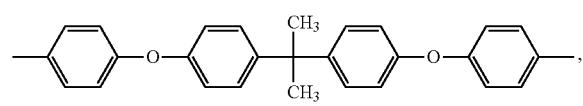

and A' is

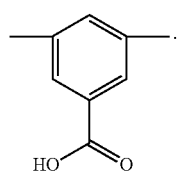

In an embodiment of the present invention, the aziridine crosslinking agent may include:

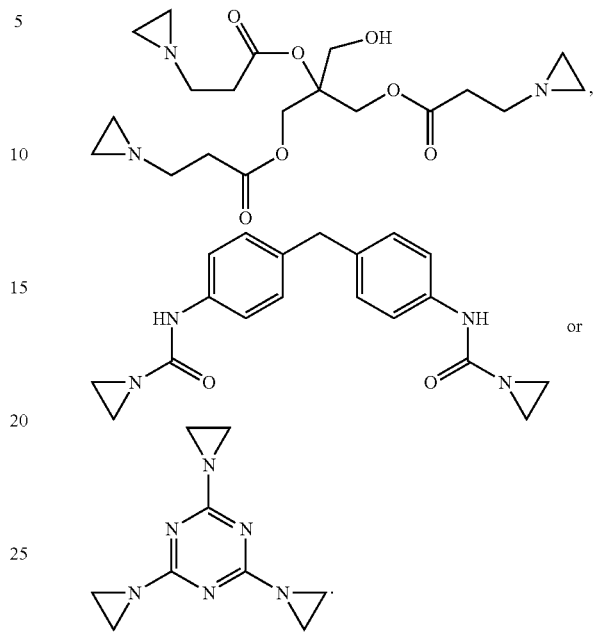

In an embodiment of the present invention, the polyimide composition further includes an additive, including a surfactant, a porogen or a combination thereof.

In an embodiment of the present invention, the polyimide composition further includes sorbitan monolaurate, polyoxyethylene sorbitan monolaurate, ethylene glycol, polyvinyl pyrrolidone, acetone or a combination thereof.

In an embodiment of the present invention, based on the total weight of the polyimide composition, the content of the dissolvable polyimide is 5 to 25 wt %, the content of the crosslinking agent is 1 to 15 wt %, and the content of the additive is 1 to 30 wt %.

Based on the above description, the polyimide composition of the present invention includes a dissolvable polyimide, a crosslinking agent, and a solvent, and the dissolvable polyimide contains a specific ratio of a divalent organic group derived from a diamine containing aromatic group and a divalent organic group derived from a diamine containing aromatic group and carboxylic acid group, such that the dissolvable polyimide can be dissolved in the solvent and cross-linked with the crosslinking agent. As such, the polyimide composition of the present invention is convenient for being processed to form a membrane, and a separation membrane with good solvent resistance and processability that is useful in UF and NF can be prepared through the preparation method of separation membrane using the polyimide composition according to the present invention.

To make the features and advantages of the present invention clearer and more comprehensible, the present invention is described in detail below with reference to specific embodiments.

DESCRIPTION OF THE EMBODIMENTS

Herein, the range from "one numerical value to another numerical value" is a summary notation by which all numerical values in the range are avoided to be enumerated in the specification. Therefore, reference to a particular numerical range encompasses any numerical values within that range and smaller numerical ranges defined by any numerical values within that range, as if any of the numerical values and the smaller ranges of numerical values are expressly indicated in the specification.

Herein, the structure of a polymer or a group is sometimes represented by a skeleton formula. In this representation, carbon atoms, hydrogen atoms, and carbon-hydrogen bonds may be omitted. Of course, where the atom or atomic group is expressly drawn in the structural formula, the atom or atomic group drawn prevails.

To prepare a separation membrane with good solvent resistance and processability that can be used in UF and NF, the present invention provides a polyimide composition, and a preparation method of separation membrane using the polyimide composition. The separation membrane prepared through the preparation method of separation membrane can achieve the above advantages. Hereinafter, the polyimide composition, and the preparation method of separation membrane of the present invention are described in detail with reference to embodiments, based on which the present invention can be practiced.

[Polyimide Composition]

A polyimide composition according to an embodiment of the present invention includes a dissolvable polyimide, a crosslinking agent, and a solvent.

In this embodiment, the dissolvable polyimide is represented by formula 1:

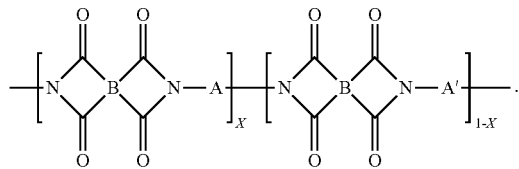

formula 1

In formula 1, B is a tetravalent organic group derived from a tetracarboxylic dianhydride containing aromatic group. That is to say, B is a residue in the tetracarboxylic dianhydride containing aromatic group other than the two 2 carboxylic dianhydride groups (—(CO)$_2$O). Herein, the tetracarboxylic dianhydride containing aromatic group is also referred to as dianhydride monomer.

Particularly, in this embodiment, B is

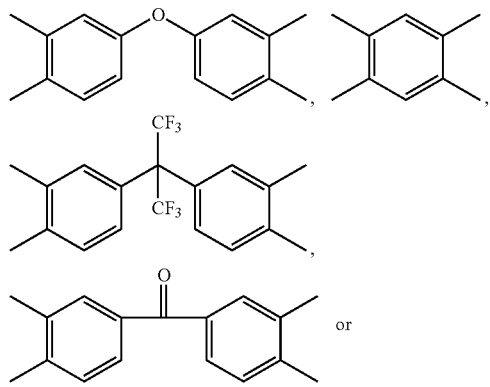

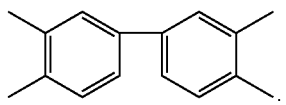

That is to say, the tetracarboxylic dianhydride containing aromatic group (that is, dianhydride monomer) may be bis-(3-phthalyl anhydride) ether (ODPA), 1,2,4,5-benzenetetracarboxylic anhydride (PMDA), 4,4'-(hexafluoroisopropylidene) diphthalic anhydride (6FDA), 3,3',4,4'-benzophenonetetracarboxylic dianhydride (BTDA), or 3,3',4,4'-biphenyltetracarboxylic dianhydride (BPDA).

In formula 1, A is a divalent organic group derived from a diamine containing aromatic group, and A' is a divalent organic group derived from a diamine containing aromatic group and carboxylic acid group. That is to say, A and A' are respectively a residue in the diamine compound other than the 2 amino groups (—NH$_2$). Herein, the diamine containing aromatic group, and the diamine containing aromatic group and carboxylic acid group are both referred to as diamine monomers. From another point of view, in this embodiment, plural diamine monomers need to be used for preparing the dissolvable polyimide represented by formula 1.

Particularly, in this embodiment, A is

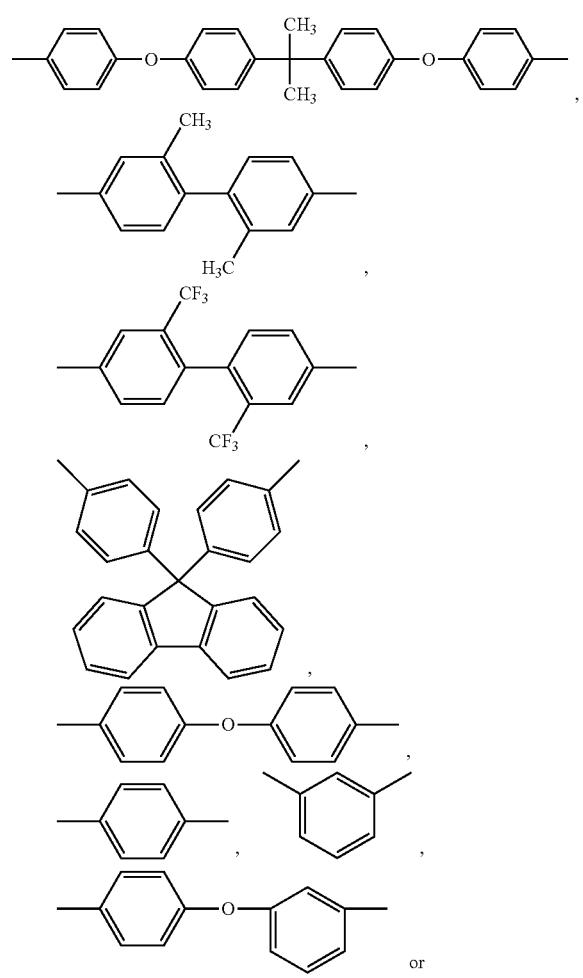

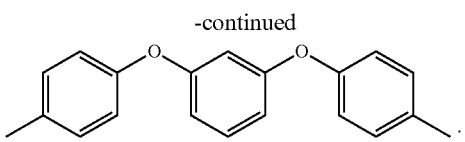

That is to say, the diamine containing aromatic group (that is, diamine monomer) may be 2,2-bis [(4-aminophenoxy) phenyl] propane (BAPP), 2,2'-bis(methyl)benzidine (DMB), 2,2'-bis(trifluoromethyl)benzidine (TFMB), 4,4'-(9-fluorenylidene)dianiline (FDA), 4,4'-diaminodiphenyl ether, p-phenylenediamine, m-phenylenediamine, 2,4'-diaminodiphenyl ether or 1,3-bis-4-aminophenoxybenzene (TPE-R).

Further, in this embodiment, A' is

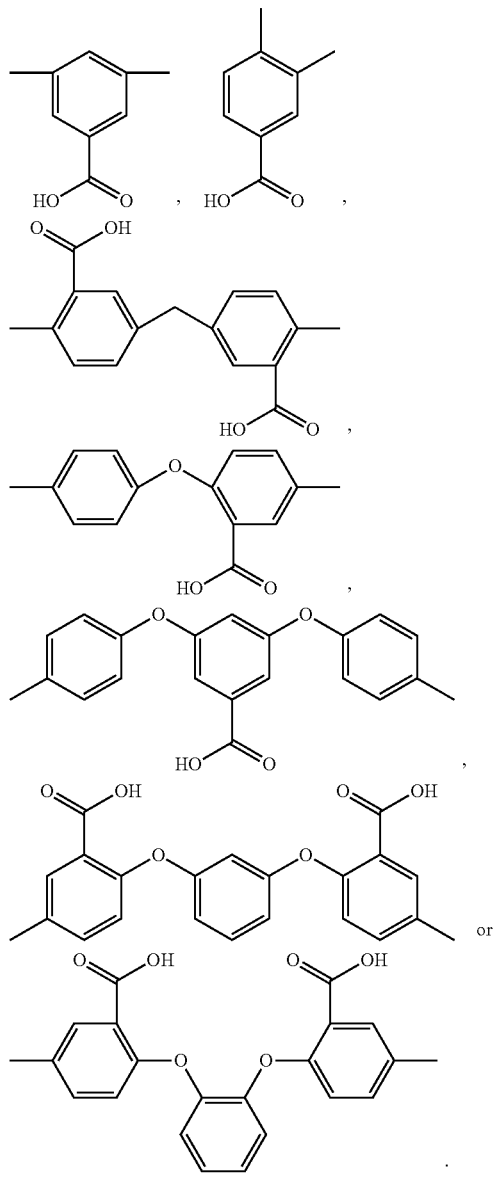

That is to say, the diamine containing aromatic group and carboxylic acid group (that is, diamine monomer) may be 3,5-diaminobenzoic acid (DABA), 3,4-diaminobenzoic acid, 5,5'-methylene bis(2-amino-benzoic-acid) (MBA), or other diamines bearing a carboxylic acid functional group.

In formula 1, 0.1≤X≤0.9, and preferably 0.3≤X≤0.7.

Moreover, the dissolvable polyimide represented by formula 1 is obtained through an imidization reaction of the dianhydride monomer and the diamine monomers. In particular, the imidization takes place in a solvent through any method well known to those skilled in the art. The solvent is not particularly limited, as long as it can dissolve the dianhydride monomer and the diamine monomers. In this embodiment, the solvent includes, but is not limited to: N-methyl-2-pyrrolidone (NMP), N,N-dimethylacetamide (DMAc), dimethyl sulfoxide (DMSO), dimethylformamide (DMF), hexamethylphosphoramide, m-cresol or a combination thereof. In addition, the imidization ratio of the imidization reaction is 100%. In addition, in an embodiment, B in formula 1 is

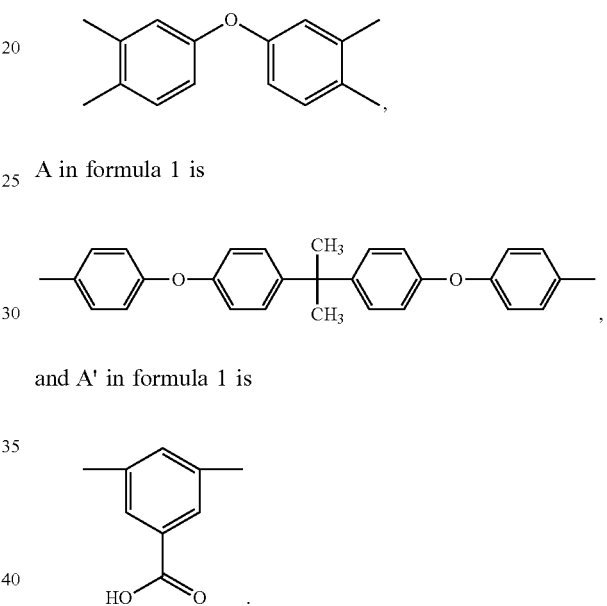

A in formula 1 is and A' in formula 1 is

Notably, the inventors find that the polyimide can be dissolved in a solvent (described in detail hereinafter) by comprising a divalent organic group derived from a diamine containing aromatic group, and the polyimide can be crosslinked with a crosslinking agent (described in detail hereinafter) by comprising a divalent organic group derived from a diamine containing aromatic group and carboxylic acid group. As a result, in this embodiment, the dissolvable polyimide represented by formula 1 can be dissolved in the solvent (described in detail hereinafter) and crosslinked with the crosslinking agent (described in detail hereinafter) by comprising a specific ratio of the divalent organic group derived from a diamine containing aromatic group and the divalent organic group derived from a diamine containing aromatic group and carboxylic acid group.

In this embodiment, the crosslinking agent may be an aziridine crosslinking agent, an isocyanate crosslinking agent, an epoxy crosslinking agent, a diamine crosslinking agent or a triamine crosslinking agent. In particular, in this embodiment, the crosslinking agent can be crosslinked with the carboxylic acid group contained in the divalent organic group derived from a diamine containing aromatic group and carboxylic acid group in the dissolvable polyimide represented by formula 1, at a temperature ranging from 15 to 100° C.

Particularly, in this embodiment, the aziridine crosslinking agent may include:

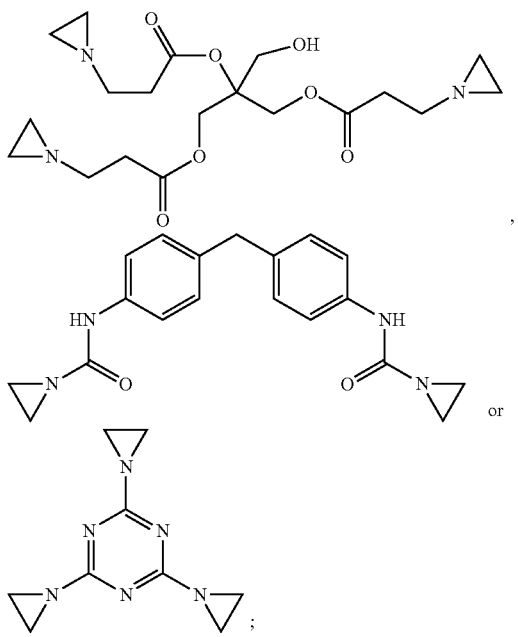

the isocyanate crosslinking agent is, for example, but not limited to: diphenyl-methane diisocyanate (MDI) or toluene diisocyanate (TDI); the diamine crosslinking agent is, for example, but not limited to: ethylenediamine, hexylenediamine or p-phenylenediamine; and the triamine crosslinking agent is, for example, but not limited to: triethylamine.

In this embodiment, the solvent is not particularly limited, as long as it can dissolve the dissolvable polyimide and the crosslinking agent. In particular, in this embodiment, the solvent includes, but is not limited to: N-methyl-2-pyrrolidone (NMP), N,N-dimethylacetamide (DMAc), dimethyl sulfoxide (DMSO), dimethylformamide (DMF) or a combination thereof.

Moreover, in this embodiment, the polyimide composition further includes an additive. In particular, in this embodiment, the membrane prepared with the polyimide composition is allowed to have a lacy structure with the aid of the additive. More particularly, in this embodiment, the additive includes a surfactant, a porogen or a combination thereof, and the surfactant may be, for example, an emulsifier. The surfactant includes, but is not limited to, sorbitan monolaurate or polyoxyethylene sorbitan monolaurate. The porogen includes, but is not limited to, ethylene glycol, polyvinyl pyrrolidone (PVP), acetone or a combination thereof.

Furthermore, in this embodiment, based on the total weight of the polyimide composition, the content of the dissolvable polyimide is 5 to 25 wt %, and preferably 8 to 20 wt %; the content of the crosslinking agent is 1 to 15 wt %, and preferably 1 to 10 wt %; and the content of the additive is 1 to 30 wt %, and preferably 5 wt % to 20 wt %. In particular, if the content of the dissolvable polyimide is lower than 5 wt %, the strength of the membrane is poor; and if the content of the dissolvable polyimide is higher than 25 wt %, the processability is poor. If the content of the crosslinking agent is lower than 1 wt %, the degree of crosslinking is insufficient; and if the content of the crosslinking agent is higher than 15 wt %, the processability is poor. If the content of the additive is lower than 1 wt %, the continuity of the pores is insufficient; and if the content of the additive is higher than 30 wt %, the strength of the membrane is poor.

Notably, as described above, by comprising a specific ratio of the divalent organic group derived from a diamine containing aromatic group and the divalent organic group derived from a diamine containing aromatic group and carboxylic acid group, the dissolvable polyimide represented by formula 1 can be dissolved in the solvent and crosslinked with the crosslinking agent. As a result, by including the dissolvable polyimide, the crosslinking agent, and the solvent, the polyimide composition is convenient for being processed to form a membrane, and the membrane prepared with the polyimide composition has porosity and good solvent resistance.

Further, the polyimide composition having the above advantages is useful in the preparation of a separation membrane for use in a separation process.

[Preparation Method of Separation Membrane]

The preparation method of separation membrane according to an embodiment of the present invention includes the following steps. First, a polyimide composition according to any one of the above embodiments is provided. In particular, the polyimide composition is prepared by uniformly mixing a dissolvable polyimide with a crosslinking agent in a solvent at a temperature ranging from 15 to 100° C. The mixing method is not particularly limited, as long as the dissolvable polyimide can be uniformly mixed with the crosslinking agent in the solvent to facilitate the progression of the crosslinking process (described in detail hereinafter). Moreover, the polyimide composition and the components therein have been described in detail in the foregoing embodiments, and thus are not described here again.

Then, a crosslinking process is performed on the polyimide composition. In particular, the carboxylic acid group contained in the divalent organic group derived from a diamine containing aromatic group and carboxylic acid group in the dissolvable polyimide is cross-linked with the crosslinking agent in this step, to form a polyimide having a crosslinked structure. More particularly, in this embodiment, the duration of the crosslinking process is from 1 to 8 hours, and the temperature of the crosslinking process is in the range of 15 to 100° C., and preferably 15 to 35° C. In other words, the crosslinking process in this embodiment preferably takes place at normal temperature, so as to save the time for heating the solution, and attain a good process efficiency.

Next, the polyimide composition which has been subjected to the crosslinking process is coated on a substrate to form a polyimide membrane. In this step, the substrate is not particularly limited, as long as it can support the polyimide membrane. Particularly, the substrate is, for example, a polyester nonwoven fabric or a polypropylene nonwoven fabric. Moreover, in this step, the coating method includes, but is not limited to, doctor blade coating, wire bar coating, or screen printing. Furthermore, in this embodiment, the thickness of the polyimide membrane is from 50 to 200 μm.

Then, a wet phase inversion process is performed on the polyimide membrane, so as to obtain a separation membrane. In this embodiment, the wet phase inversion process includes the following steps. First, the polyimide membrane is soaked in a non-solvent contained in a coagulation bath. In particular, after the polyimide membrane is brought into contact with the non-solvent, mass transfer and exchange may take place between the solvent in the polyimide membrane and the non-solvent, such that the polyimide is precipitated out and phase separation occurs, so as to form a polymer rich phase and a polymer lean phase. The polymer rich phase is solidified to form a membrane matrix, and the polymer lean phase forms the pores. In this embodiment, the non-solvent is, for example, water, methanol, or ethanol. Then, the membrane formed in the previous step is dried, so as to form a separation membrane. The drying may be carried out through any method known to those of skill in the art.

More particularly, as described above, during the wet phase inversion process, the polymer lean phase forms the pores, so the separation membrane is a porous membrane. In this embodiment, the average pore size is, for example, about 10 to 50 nm.

Moreover, as described above, the polyimide composition further includes an additive, whereby the separation membrane prepared has a lacy structure, that is, the pores in the separation membrane have connectivity. As such, by including an additive in the polyimide composition, the flux of the separation membrane is increased. In addition, in this embodiment, the average pore size of the pores having connectivity is, for example, about 30 to 50 nm.

Furthermore, for the purpose of obtaining a separation membrane with a large pore size so as to increase the flux, before the wet phase inversion process is performed on the polyimide membrane, the method further includes leaving the polyimide membrane to stand for 5 to 120 minutes. In particular, during the process of leaving the polyimide membrane to stand, mass transfer and exchange may take place between a part of the solvent in the polyimide membrane and the moisture after the polyimide membrane is contacted with the ambient moisture, such that a part of polyimide is precipitated out, and phase inversion takes place. In this manner, after the polyimide membrane left to stand is subjected to a wet phase inversion process, a separation membrane having an average pore size of about 30 nm to 50 nm is obtained.

Notably, as described above, the separation membrane prepared with the polyimide composition according to any one of the embodiments above after the crosslinking process, the coating process, and the wet phase inversion process has good processability, solvent resistance, and porosity. Further, as can be known from above, the pore size of the separation membrane is from 0.01 μm to 0.1 μm. As a result, the separation membrane prepared through the preparation method of separation membrane according to this embodiment can be used in UF and NF.

The features of the present invention will be described in further detail below with reference to Examples 1 to 6. Although the following examples are described, the materials used, their amounts and ratios, details and processes of treatments, etc., may be appropriately varied without departing from the scope of the present invention. Accordingly, the present invention should not be construed to be limited to the examples set forth hereinafter.

Example 1

Preparation of Dissolvable Polyimide

First, the diamine monomers BAPP and DABA were dissolved at a fixed molar ratio in an organic solvent dimethylacetamide (DMAc) or N-methylpyrrolidone (NMP). After complete dissolution, a dianhydride monomer ODPA was added for polycondensation, and a high-viscosity poly(amic acid) solution was formed, wherein the molar ratio of the monomers in reaction was BAPP:DABA: ODPA=5:5:10. Then, the poly(amic acid) was cyclized to form the dissolvable polyimide of Example 1. The dianhydride monomer was not limited to ODPA and BPDA, and the diamine monomer containing carboxylic acid group was not limited to DABA. The molar ratio of the monomers in reaction was BAPP:DABA:dianhydride monomer=5:5:10, 7:3:10 or 9:1:10.

Preparation of Polyimide Composition 15 g of the dissolvable polyimide prepared in Example 1, 5 g of an aziridine crosslinking agent, and 80 g of the solvent NMP were added to a 100 mL flask fitted with a mechanical stirrer, and stirred for 0.5 hours at 25° C. under a nitrogen atmosphere, to uniformly mix the dissolvable polyimide of Example 1 with the aziridine crosslinking agent in the solvent NMP. In this way, the polyimide composition of Example 1 was obtained.

Preparation of Separation Membrane

The polyimide composition of Example 1 was continuously stirred and cross-linked for 8 hours at 25° C. under a nitrogen atmosphere, so as to form a mixed solution of polyimides having a cross-linked structure. Then, the mixed solution was coated onto a polypropylene nonwoven fabric (that is, the substrate) by doctor blade coating, so as to form a polyimide membrane of 200 μm in thickness. Subsequently, the polyimide membrane was immediately soaked in a coagulation bath containing water (that is, the non-solvent). The polyimide was precipitated out and formed a membrane. The membrane was dried in an oven at 50° C., so as to obtain a separation membrane of Example 1.

Example 2

Preparation of Dissolvable Polyimide

A dissolvable polyimide of Example 2 was prepared following the same preparation process as that in Example 1.

Preparation of Polyimide Composition

A polyimide composition of Example 2 was prepared following the same preparation process as that in Example 1, except that the polyimide composition of Example 2 further included ethylene glycol, and the contents of the components in the polyimide composition of Example 2 were as shown in Table 1.

Preparation of Separation Membrane

The separation membrane of Example 2 was prepared following the same preparation process as that in Example 1, except that the polyimide composition of Example 2 was used.

Example 3

Preparation of Dissolvable Polyimide

A dissolvable polyimide of Example 3 was prepared following the same preparation process as that in Example 1.

Preparation of Polyimide Composition

A polyimide composition of Example 3 was prepared following the same preparation process as that in Example 1, except that the polyimide composition of Example 3 further included sorbitan monolaurate (Product name SPAN20, manufactured by Zhongyuan Chemical Company), and the contents of the components in the polyimide composition of Example 3 were as shown in Table 1.

Preparation of Separation Membrane

The separation membrane of Example 3 was prepared following the same preparation process as that in Example 1, except that the polyimide composition of Example 3 was used.

Example 4

Preparation of Dissolvable Polyimide

A dissolvable polyimide of Example 4 was prepared following the same preparation process as that in Example 1.

Preparation of Polyimide Composition

A polyimide composition of Example 4 was prepared following the same preparation process as that in Example 1, except that the polyimide composition of Example 4 further included ethylene glycol and sorbitan monolaurate (Product name SPAN20, manufactured by Zhongyuan Chemical Company), and the contents of the components in the polyimide composition of Example 4 were as shown in Table 1.

Preparation of Separation Membrane

The separation membrane of Example 4 was prepared following the same preparation process as that in Example 1, except that the polyimide composition of Example 4 was used.

Example 5

Preparation of Dissolvable Polyimide

A dissolvable polyimide of Example 5 was prepared following the same preparation process as that in Example 1.

Preparation of Polyimide Composition 12.5 g of the dissolvable polyimide prepared in Example 5, 5 g of an aziridine crosslinking agent, 4 g of polyoxyethylene sorbitan monolaurate (Product name Tween 20, manufactured by Zhongyuan Chemical Company), 4 g of PVP (Molecular weight 360 k, manufactured by Acros Corp.) and 74.5 g of the solvent NMP were added to a 100 mL flask fitted with a mechanical stirrer, and stirred for 1 hour at 25° C. under a nitrogen atmosphere, so as to uniformly mix the dissolvable polyimide of Example 5 with the aziridine crosslinking agent, Tween 20, and PVP in the solvent NMP. In this way, the polyimide composition of Example 5 was obtained.

Preparation of Separation Membrane

The polyimide composition of Example 5 was continuously stirred and cross-linked for 8 hours at 25° C. under a nitrogen atmosphere, so as to form a mixed solution of polyimides having a cross-linked structure. Then, the mixed solution was coated onto a polypropylene nonwoven fabric (that is, the substrate) by doctor blade coating, so as to form a polyimide membrane of 200 μm in thickness. Subsequently, the polyimide membrane was immediately soaked in a coagulation bath containing water (that is, the non-solvent). The polyimide was precipitated out and formed a membrane. The membrane was dried in an oven at 50° C., so as to obtain a separation membrane of Example 5.

Example 6

Preparation of Dissolvable Polyimide

A dissolvable polyimide of Example 6 was prepared following the same preparation process as that in Example 1.

Preparation of Polyimide Composition

A polyimide composition of Example 6 was prepared following the same preparation process as that in Example 5, except that the polyimide composition of Example 6 further included acetone, and the contents of the components in the polyimide composition of Example 6 were as shown in Table 1.

Preparation of Separation Membrane

The separation membrane of Example 6 was prepared following the same preparation process as that in Example 5, except that the polyimide composition of Example 6 was used.

TABLE 1

| | | Example 1 | Example 2 | Example 3 | Example 4 | Example 5 | Example 6 |
|---|---|---|---|---|---|---|---|
| Dissolvable polyimide (wt %) | | 15 | 15 | 15 | 15 | 12.5 | 12.5 |
| Aziridine crosslinking agent (wt %) | | 5 | 5 | 5 | 5 | 5 | 5 |
| Additive | Ethylene glycol (wt %) | — | 8 | — | 8 | — | — |
| | Span 20 (wt %) | — | — | 4 | 4 | — | — |
| | Tween 20 (wt %) | — | — | — | — | 4 | 4 |
| | PVP (wt %) | — | — | — | — | 4 | 4 |
| | Acetone (wt %) | — | — | — | — | — | 15 |
| NMP (wt %) | | 80 | 72 | 76 | 68 | 74.5 | 59.5 |

Then, the solvent resistance test, and the measurements of the average pore size and the pure water permeation flux were performed on the separation membranes of Examples 1-6. The above-mentioned measurements are illustrated below. The results of the average pore size and the pure water permeation flux are shown in Table 2.

<Solvent Resistance Test>

The separation membranes of Examples 1-6 were placed in the solvent NMP for 24 hours, and observed. The results show that the cross-linked separation membranes of Examples 1-6 are not back dissolved in the solvent NMP. That is, the separation membranes of Examples 1-6 have good stability against NMP.

<Measurement of Average Pore Size>

The pore size of each of the separation membranes prepared in Examples 1-6 was determined following the test standard ASTM F316, using Capillary Flow Porometer (Model no. CFP-1200-AE, manufactured by POROUS MATERIALS INC., PMI).

<Measurement of Pure Water Permeation Flux>

First, the separation membranes of Examples 1-6 were fabricated into a tubular membrane (inner diameter: 3 mm) for UF, respectively. Then, the resultant tubular membrane for UF was fitted on the tester. Next, pure water was fed to the feed side of the tester, and the tester was operated at a fixed pressure of 1 bar to determine the pure water permeation flux. During the process, the stabilization time was 1 hour, and the sampling time was 10 minutes.

TABLE 2

|  | Example 1 | Example 2 | Example 3 | Example 4 | Example 5 | Example 6 |
|---|---|---|---|---|---|---|
| Average pore size (μm) | 0.018 | 0.0256 | 0.0304 | 0.0248 | 0.05 | 0.05 |
| Pure water permeation flux (LMH) | 0.569 | 0.324 | 0.467 | 0.955 | 1.8 | 13.5 |

It can be known from Table 2 that the separation membranes of Examples 1-6 all have an average pore size ranging from 0.01 to 0.1 μm, and a good flux. Therefore, the separation membranes of Examples 1-6 are suitable for use in UF. In addition, a rejection coefficient test was further performed on the tubular membrane fabricated with the separation membrane of Example 6 by using a PVP 360K solution, and the rejection coefficient was up to 91%.

The present invention has been described by way of examples; however, the present invention is not limited thereto. Various changes and modifications may be made by those skilled in the art without departing from the spirit and protection scope of the present invention as defined by the appended claims.

What is claimed is:

1. A preparation method of separation membrane, comprising:

providing a polyimide composition comprising:

a dissolvable polyimide represented by formula 1:

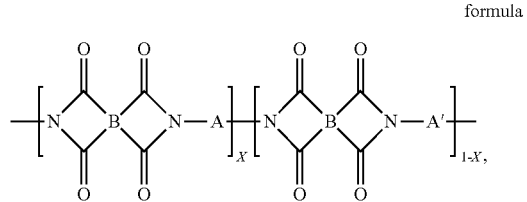

formula 1 wherein B is a tetravalent organic group derived from a tetracarboxylic dianhydride containing aromatic group, A is a divalent organic group derived from a diamine containing aromatic group, A' is a divalent organic group derived from a diamine containing aromatic group and carboxylic acid group, and 0.1≤X≤0.9;

a crosslinking agent, wherein the crosslinking agent is an aziridine crosslinking agent, an isocyanate crosslinking agent, an epoxy crosslinking agent, diamine crosslinking agent, or a triamine crosslinking agent; and a solvent;

performing a crosslinking process on the polyimide composition, wherein a temperature of the crosslinking process is from 15 to 35° C.;

coating the polyimide composition which has been subjected to the crosslinking process on a substrate to form a polyimide membrane; and performing a wet phase inversion process on the polyimide membrane, wherein based on a total weight of the polyimide composition, a content of the dissolvable polyimide is 5 to 25 wt %, and a content of the crosslinking agent is 1 to 15 wt %.

2. The preparation method of separation membrane according to claim 1, wherein the polyimide composition further comprises an additive, including a surfactant, a porogen or a combination thereof.

3. The preparation method of separation membrane according to claim 2, wherein based on the total weight of the polyimide composition, a content of the additive is 1 to 30 wt %.

4. The preparation method of separation membrane according to claim 1, wherein the polyimide composition further comprises sorbitan monolaurate, polyoxyethylene sorbitan monolaurate, ethylene glycol, polyvinyl pyrrolidone, acetone or a combination thereof.

5. The preparation method of separation membrane according to claim 1, wherein B is

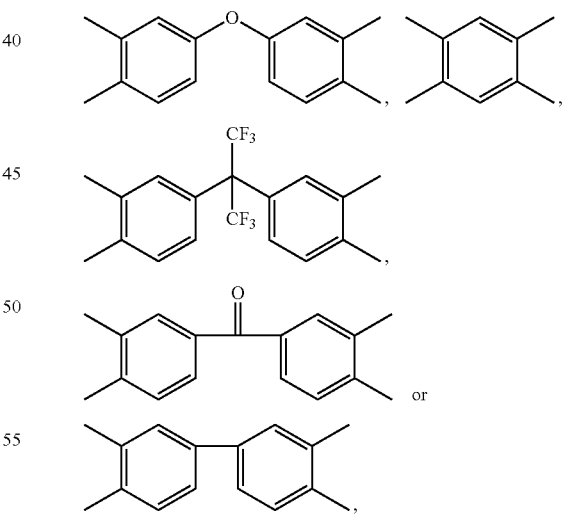

A is

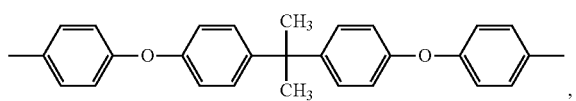

-continued
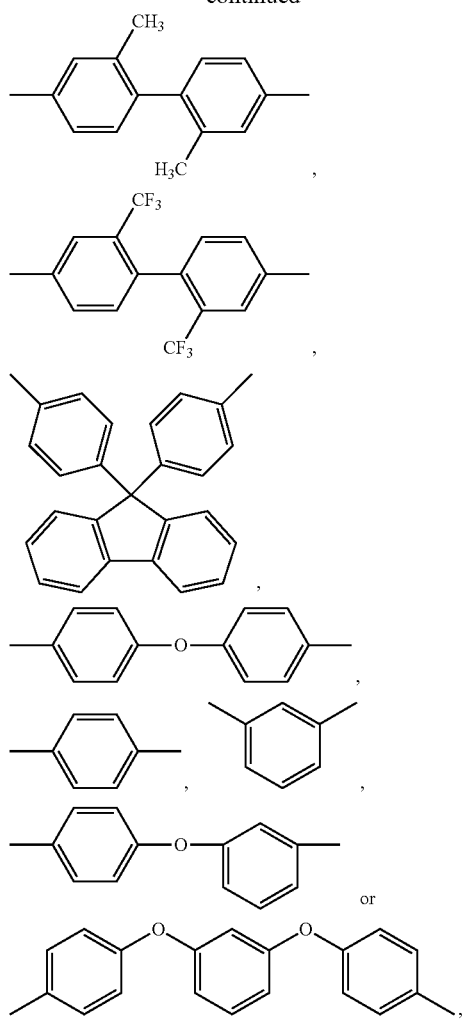
and A' is
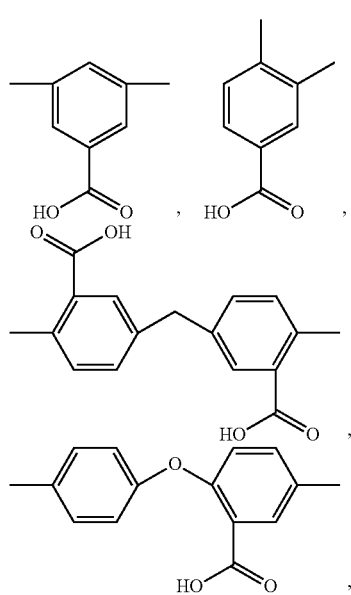
-continued
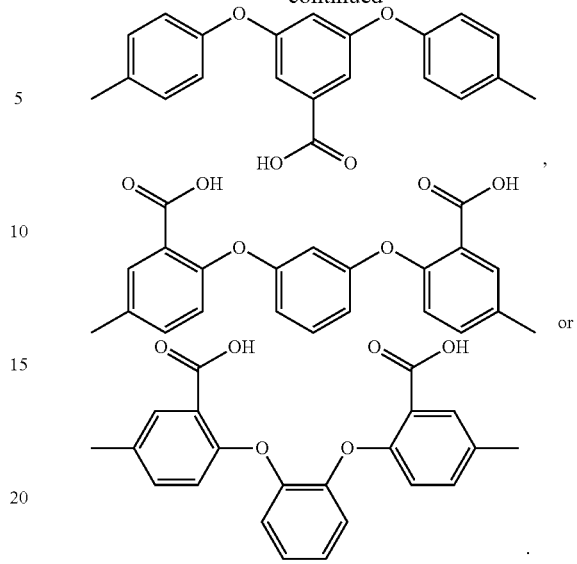
6. The preparation method of separation membrane according to claim 1, wherein B is
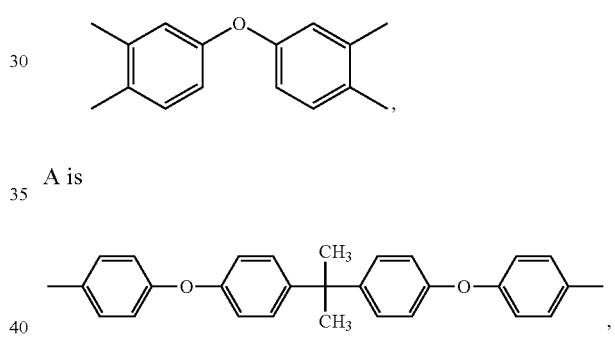
A is
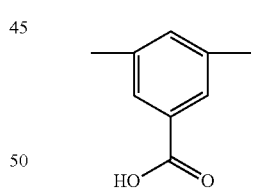
and A' is
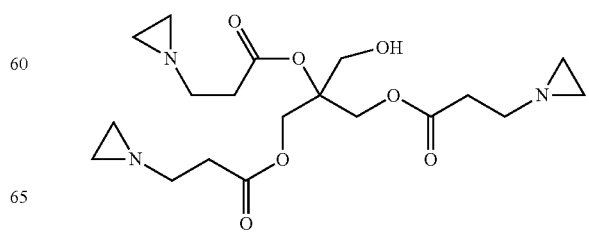
7. The preparation method of separation membrane according to claim 1, wherein the aziridine crosslinking agent comprises:

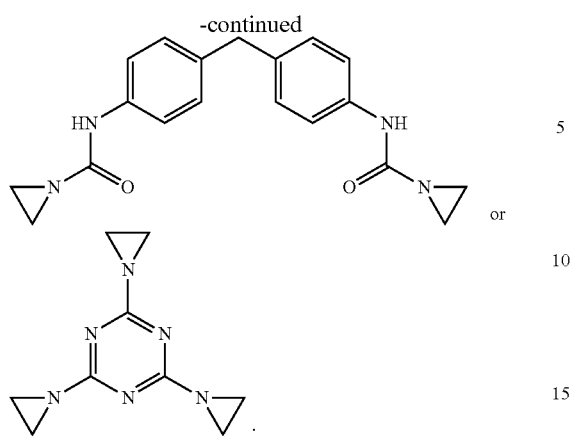

or

8. The preparation method of separation membrane according to claim 1, wherein a duration of the crosslinking process is from 1 to 8 hours.

9. The preparation method of separation membrane according to claim 1, wherein a thickness of the polyimide membrane is from 50 to 200 μm.

10. The preparation method of separation membrane according to claim 1, wherein before the wet phase inversion process is performed on the polyimide membrane, the method further comprises leaving the polyimide membrane to stand for 5 to 120 minutes.

* * * * *